(12) United States Patent
Lee et al.

(10) Patent No.: US 7,632,093 B2
(45) Date of Patent: Dec. 15, 2009

(54) PYROLYSIS FURNACE HAVING GAS FLOWING PATH CONTROLLER

(75) Inventors: Kyo-yeol Lee, Gyeonggi-do (KR); Eun-hye Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 578 days.

(21) Appl. No.: 11/218,465

(22) Filed: Sep. 6, 2005

(65) Prior Publication Data
US 2006/0051257 A1 Mar. 9, 2006

(30) Foreign Application Priority Data
Sep. 6, 2004 (KR) .................. 10-2004-0070818

(51) Int. Cl.
*F27B 5/14* (2006.01)
(52) U.S. Cl. .............. 432/209; 432/202; 432/228; 432/224; 422/129
(58) Field of Classification Search ............ 432/182, 432/194, 200, 202, 209, 212, 224, 228; 219/537, 219/541, 543, 546; 438/238, 396; 392/480; 422/129
See application file for complete search history.

(56) References Cited

U.S. PATENT DOCUMENTS

| | | | | |
|---|---|---|---|---|
| 2,790,838 | A * | 4/1957 | Schrader | 585/539 |
| 3,972,682 | A * | 8/1976 | Stephens et al. | 422/78 |
| 4,020,273 | A * | 4/1977 | Dix et al. | 373/110 |
| 4,180,723 | A * | 12/1979 | Szupillo | 219/541 |
| 4,868,840 | A * | 9/1989 | Deki et al. | 372/56 |
| 5,097,890 | A * | 3/1992 | Nakao | 165/206 |
| 6,184,049 | B1 * | 2/2001 | Watanabe et al. | 438/22 |
| 6,245,298 | B1 * | 6/2001 | Bremer et al. | 422/80 |
| 6,586,785 | B2 | 7/2003 | Flagan et al. | |
| 6,719,953 | B2 * | 4/2004 | Di Nicolantonio et al. | 422/198 |
| 6,808,983 | B2 * | 10/2004 | Hill | 438/255 |
| 6,867,047 | B2 * | 3/2005 | Rhodes | 436/118 |
| 6,868,230 | B2 * | 3/2005 | Gerhardinger | 392/483 |
| 7,003,220 | B2 * | 2/2006 | Gerhardinger | 392/483 |
| 7,121,474 | B2 * | 10/2006 | Bourianoff et al. | 235/494 |
| 7,183,228 | B1 * | 2/2007 | Dai et al. | 438/780 |
| 2006/0027499 | A1 * | 2/2006 | Ajayan et al. | 210/636 |
| 2007/0190240 | A1 * | 8/2007 | Choi et al. | 427/123 |

(Continued)

FOREIGN PATENT DOCUMENTS

JP  63-042377  2/1988

(Continued)

OTHER PUBLICATIONS

Korean Office Action (with English translation) dated Apr. 24, 2006.

*Primary Examiner*—Gregory A Wilson
(74) *Attorney, Agent, or Firm*—Cantor Colburn LLP

(57) ABSTRACT

Provided is a pyrolysis furnace having a gas flowing path controller with an improved structure. The pyrolysis furnace includes: a silicon substrate; a main body of the pyrolysis furnace; a heating unit that is formed around the main body and controls the temperature of the main body; at least one gas supplying tube through which a gas flows into the main body; and a gas flowing path controller that is installed inside the main body and controls the flow of the gas. As a result, controlling and manufacturing of small-sized nanoparticles with excellent characteristics is possible.

6 Claims, 5 Drawing Sheets

U.S. PATENT DOCUMENTS

| | | | |
|---|---|---|---|
| 2007/0224107 A1* | 9/2007 | Hikata | 423/460 |
| 2008/0217008 A1* | 9/2008 | Langdon et al. | 166/270 |
| 2008/0226821 A1* | 9/2008 | Patrovsky | 427/255.39 |

FOREIGN PATENT DOCUMENTS

| | | |
|---|---|---|
| JP | 64-047029 | 2/1989 |
| JP | 64-054329 | 3/1989 |
| JP | 04-058521 | 2/1992 |
| JP | 04-346282 | 12/1992 |
| JP | 07-066139 | 3/1995 |
| JP | 08-274031 | 10/1996 |
| JP | 09-060835 | 3/1997 |
| KR | 1999-52233 | 7/1999 |

* cited by examiner

RELATED ART

PYROLYSIS FURNACE HAVING GAS FLOWING PATH CONTROLLER

BACKGROUND OF THE INVENTION

This application claims the priority of Korean Patent Application No. 10-2004-0070818, filed on Sep. 6, 2004 in the Korean Intellectual Property Office, the disclosure of which is incorporated herein in its entirety by reference.

1. Field of the Disclosure

The present disclosure relates to a pyrolysis furnace having an improved gas flowing path controller, and more particularly, to a pyrolysis furnace which controls the flow speed of a gas such as a source gas, uniformly heats the source gas, and controls pyrolysis characteristics of the source gas, thereby manufacturing nanoparticles of uniform size.

2. Description of the Related Art

Methods of manufacturing nanoparticles are mainly divided into chemical wet process methods and vapor deposition methods. A vapor deposition method can be used to freely control the size of nanoparticles compared to other methods, and form nanoparticles at desired locations. Typical vapor deposition methods include a laser ablation method and a pyrolysis method.

In the pyrolysis method, a precursor of a material that is to be processed is used. In more detail, by applying heat to a precursor, which is a source gas, the precursor is pyrolyzed, and monomers in an aerosol state are generated from the pyrolyzed precursor. The monomers are developed to form nanoparticles. Such a pyrolysis method is performed using a simple manufacturing apparatus and process, and the size of the nanoparticles can be easily controlled.

FIGS. 1A and 1B are views of conventional apparatuses for fabricating nanoparticles. FIG. 1A is a schematic view of a pyrolysis furnace 11, an oxidation furnace 12, and a deposition chamber 13 according to the prior art, and FIG. 1B is a cross section of a pyrolysis furnace disclosed in U.S. Pat. No. 6,586,785.

Referring to FIG. 1A, the pyrolysis furnace 11 is fed a source gas 11a of nanoparticles to be formed in the pyrolysis furnace 11 and a carrier gas 11b. The inside temperature of the pyrolysis furnace 11 is maintained at about 900° C. by a heating device (not shown), and thus the source gas 11a is pyrolyzed. When oxidation of the pyrolyzed source gas 11a is required, the source gas is oxidized at a high temperature of about 700° C. or higher inside the oxidation furnace 12. Then, the pyrolyzed and oxidated source gas flows into the deposition chamber 13, thereby depositing nanoparticles on a substrate 13a.

The pyrolysis furnace 11 may take the form of the pyrolysis furnace illustrated in FIG. 1B. The pyrolysis furnace 11 is fed a source gas 11a and a carrier gas 11b via a source gas tube 15 and a carrier gas tube 14, respectively. The source gas 11a and the carrier gas 11b are mixed and preheated in a ramping region 18a of the pyrolysis furnace 11, and are pyrolyzed in a thermal decomposition region 18b, thereby changing into an aerosol state at a high temperature. Then, the aerosol flows in a direction indicated by an arrow 16a towards an exit 16b and into a deposition chamber (not shown) in which the nanoparticles forming process is performed.

The basic characteristics such as the size, density, and dispersion of the nanoparticles are determined by the density of the source gas 11a, that is, a precursor. When fabricating nanoparticles with a high density, the density of the source gas 11a needs to be high. However, as the density of the precursor increases, the dispersion characteristics of the generated nanoparticles deteriorate.

Such a disadvantage is known to be related to a reaction that occurs when the source gas 11a enters into the pyrolysis furnace 11 for the pyrolysis process. That is, the pyrolysis characteristics of the source gas 11a change according to the amount of time the source gas 11a remains in the ramping region 18a (i.e., a preheating region) after the source gas 11a enters the pyrolysis furnace 11 and before the pyrolysis occurs.

FIG. 2 is a graph illustrating the temperature distribution of a gas injected into the pyrolysis furnace 11 illustrated in FIG. 1B. In the graph, it can be seen that there is a great change in the temperature in the ramping region 18a when the source gas 11a and the carrier gas 11b are supplied to the pyrolysis furnace 11. If the time the gas spends in the ramping region 18a increases due to the temperature change, the size of a precursor, which is the source gas 11a, changes, thereby deteriorating the dispersion characteristics of nanoparticles.

To form nanoparticles of uniform size, the source gas 11a and the carrier gas 11b must be quickly and sufficiently mixed in uniform densities before pyrolysis occurs, and the mixed gases must have a uniform density distribution throughout the pyrolysis furnace 11. However, a conventional pyrolysis apparatus and process does not satisfy these requirements.

SUMMARY OF THE INVENTION

Embodiments of the present invention provide a pyrolysis furnace having a ramping region with an improved structure to minimize the time required to preheat a precursor, which is a source gas, thereby improving pyrolysis characteristics of the precursor when fabricating nanoparticles using a pyrolysis method.

According to an aspect of the present invention, there is provided a pyrolysis furnace including: a main body of the pyrolysis furnace; a heating unit that is formed around the main body and controls the temperature of the main body; at least one gas supplying tube through which a gas flows into the main body; and a gas flowing path controller that is installed inside the main body and controls the flow of the gas.

The main body can include a ramping region in which a supply gas is preheated; and a pyrolysis region in which the source gas is pyrolyzed.

The gas flowing path controller can be installed in the ramping region.

A gas flowing path can be formed between an outer wall of the gas flowing path controller and an inner wall of the main body so that the gas can flow into the pyrolysis region between the outer wall of the gas flowing path controller and the inner wall of the main body.

The gas flowing path controller can be supported by a movable supporter connected to the gas flowing path controller and a side wall of the main body so that the location of the gas flowing path controller can be adjusted inside the main body.

An outer wall of the gas flowing path controller can contact an inner wall of the main body, and at least one gas flowing path is formed inside the gas flowing path controller so that the gas can flow into the pyrolysis region.

The gas flowing path can include through-holes passing through the gas flowing path controller.

The diameters of the through-holes are greater near the inner wall of the main body.

The gas flowing path controller can be formed of the same material as the main body.

The gas flowing path controller can be formed of a material including quartz.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A pyrolysis furnace with a gas flowing path controller having an improved structure will now be described more fully with reference to the accompanying drawings, in which exemplary embodiments of the invention are shown.

Figure 1A:
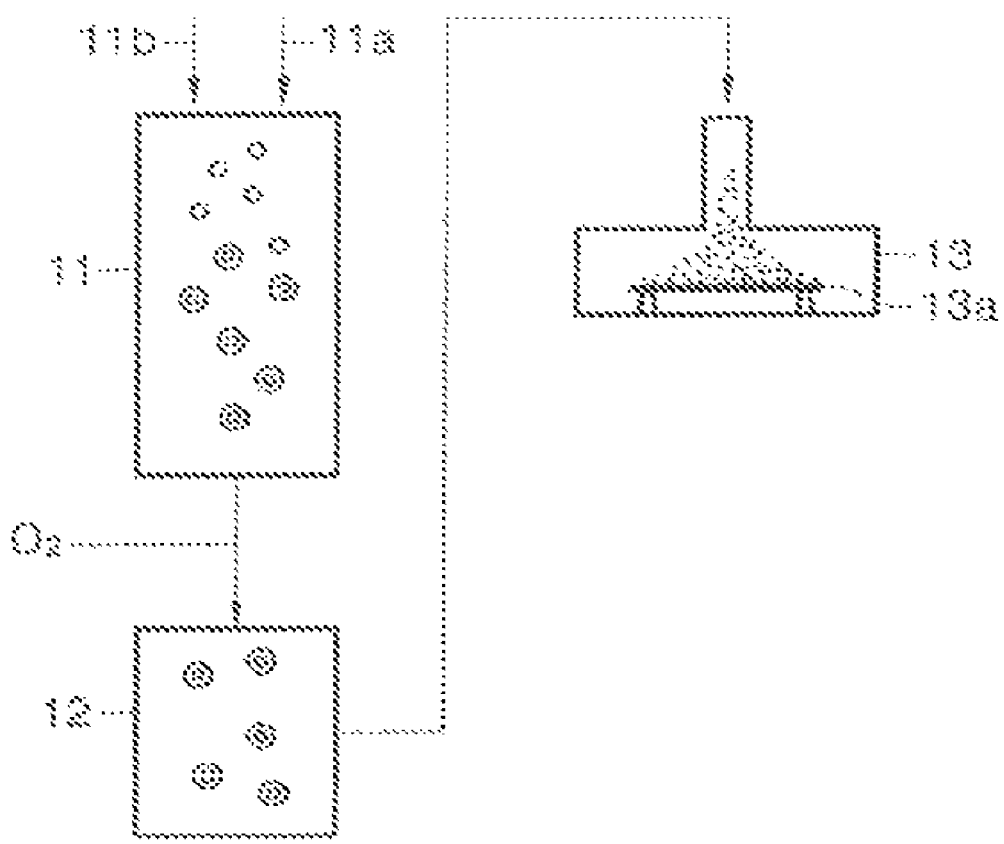
FIG. 1A is a schematic view of a pyrolysis furnace, an oxidation furnace, and a deposition chamber according to the prior art.
Figure 1B:
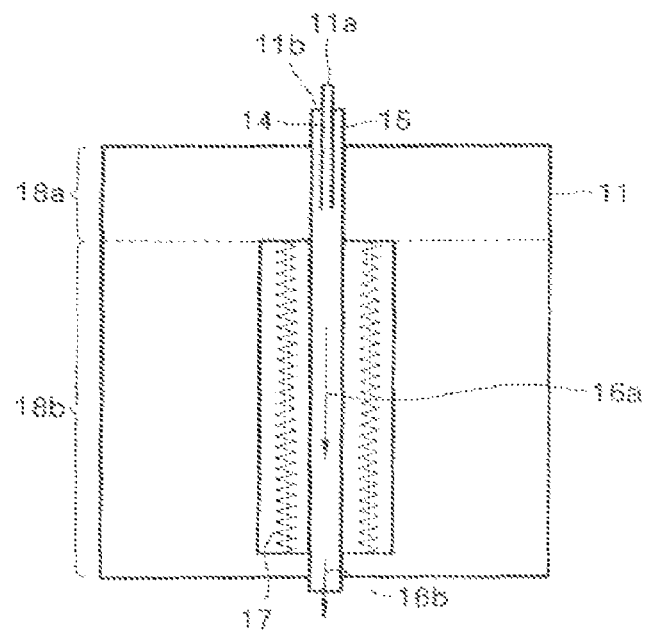
FIG. 1B is a cross section of a pyrolysis furnace disclosed in U.S. Pat. No. 6,586,785.
Figure 2:
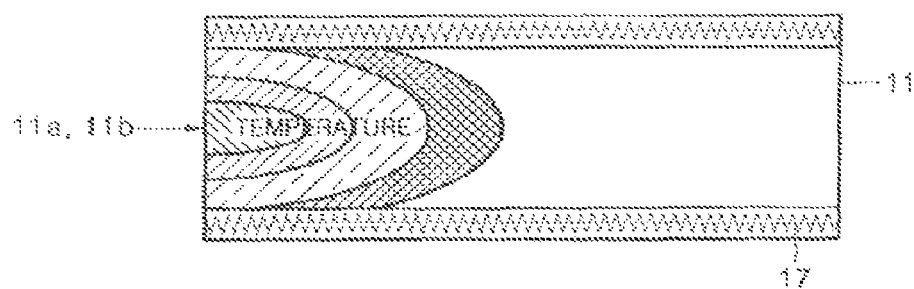
FIG. 2 is a graph illustrating the temperature distribution of a gas injected into a pyrolysis furnace illustrated in FIG. 1B.
Figure 3A:
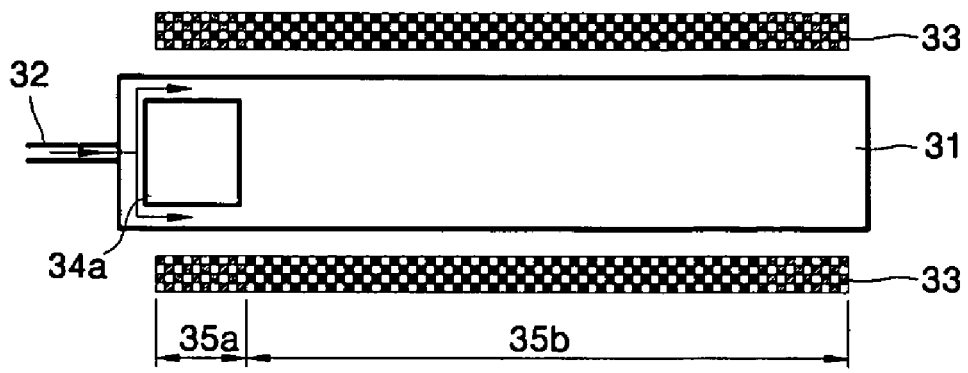
FIGS. 3A through 3C are views of a pyrolysis furnace including a gas flowing path controller according to an embodiment of the present invention.

FIG. 3A is a cross sectional view of a pyrolysis furnace including a gas flowing path controller 34a according to an embodiment of the present invention. Referring to FIG. 3A, a heating unit 33 formed around the outer circumference of a main body 31 of the pyrolysis furnace is composed of at least one gas supplying tube through which a source gas and a carrier gas pass. A ramping region 35a in which the source gas and the carrier gas are mixed and preheated, and a pyrolysis region 35b in which the source gas and the carrier gas are pyrolyzed exist in the main body 31. The gas flowing path controller 34a is formed in the ramping region 35a.

Although the cylindrical-shaped gas flowing path controller 34a is illustrated in FIG. 3A, the shape of the gas flowing path controller 34a need not be cylindrical. The gas flowing path controller 34a is formed inside the ramping region 35a, and may be made of a non-reactive material in which the pyrolysis furnace is typically made of, such as quartz.

As illustrated in FIG. 3A, for the supplied gas to propagate along the length of the pyrolysis furnace along a gas flowing path formed between the main body 31 and the gas flowing path controller 34a, the gas flowing path controller 34a must have a smaller diameter than the inner diameter of the main body 31. That is, the gas flowing path of the supply gas in the ramping region 35a is between the outer wall of the gas flowing path controller 34a and the inner wall of the main body 31.

Figure 3B:
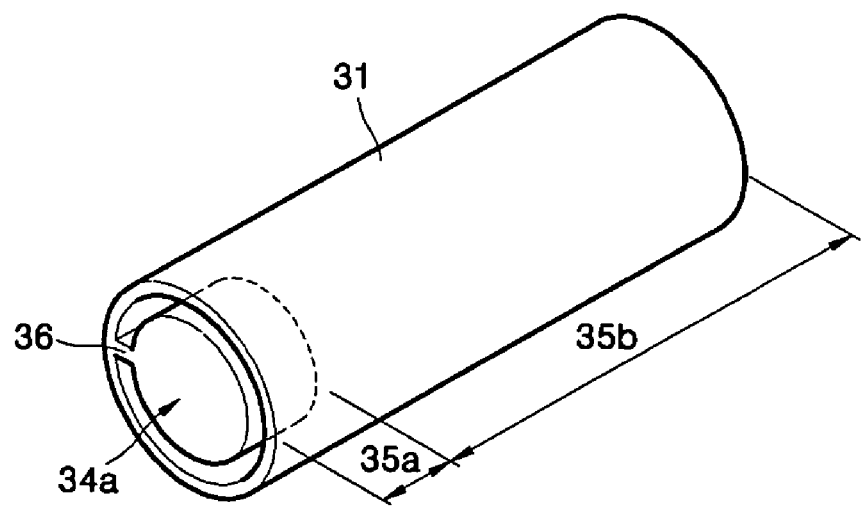
Figure 3C:
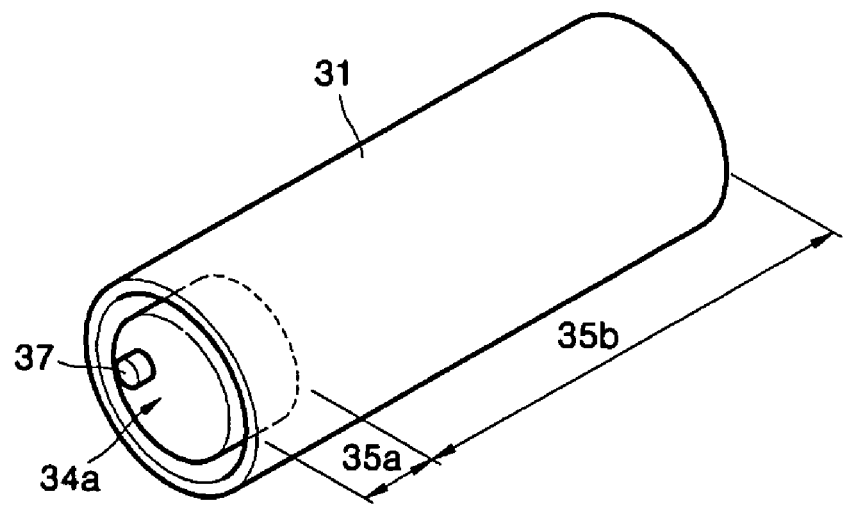

FIGS. 3B and 3C are perspective views of the gas flowing path controller 34a illustrated in FIG. 3A.

Referring to FIG. 3B, the gas flowing path controller 34a is fixed by a fixed supporter 36 connected to the inner wall of the main body 31. The fixed supporter 36 is installed inside the main body 31 so as not to affect the gas flowing path of the supply gas supplied to the main body 31.

Referring to FIG. 3C, the gas flowing path controller 34a is supported by a movable supporter 37, and the length of the movable supporter 37 can be controlled from the outside of the main body 31. Therefore, the location of the gas flowing path controller 34a can be controlled along the length of the movable supporter 37 inside the main body 31.

Figure 4A:
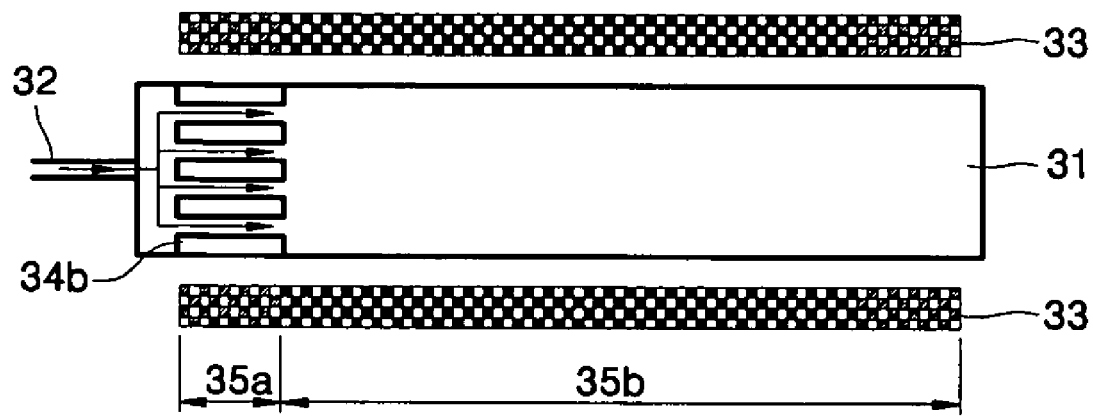
FIGS. 4A and 4B are views of a pyrolysis furnace including a gas flowing path controller according to another embodiment of the present invention.

FIG. 4A is a cross-sectional view of a pyrolysis furnace including a gas flowing path controller 34b according to another embodiment of the present invention. Referring to FIG. 4A, a main body 31 of the pyrolysis furnace can be divided into a ramping region 35a in which a source gas and a carrier gas are mixed and a pyrolysis region 35b in which the source gas and the carrier gas are pyrolyzed. The gas flowing path controller 34b is formed in the ramping region 35a, to which gas supplied through a gas supplying tube 32 is injected, and is located inside the main body 31. The structure of the pyrolysis furnace in FIG. 4A is similar to the structure of the pyrolysis furnace in FIG. 3A.

However, the gas flowing path controller 34b has a diameter similar to the inner diameter of the main body 31, and through-holes 38 are formed on the gas flowing path controller 34b so that the source gas and the carrier gas can flow along the length of the main body 31.

Figure 4B:
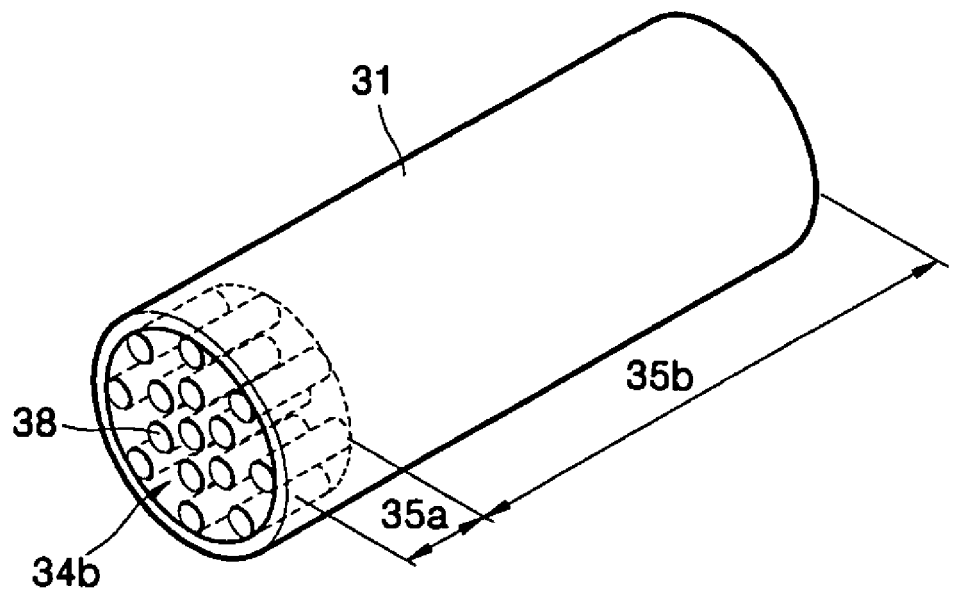

FIG. 4B is a perspective view of the pyrolysis furnace of FIG. 4A, illustrating the through-holes 38 formed inside the gas flowing path controller 34b along the length of the main body 31. The shapes and sizes of the through-holes 38 can be changed, but the size and diameter or distribution of the through-holes 38 increase further away from the center of the gas flowing path controller 34b in consideration of heat transfer since the source gas and the carrier gas need to be mixed and preheated considering the characteristics of the ramping region 35a.

The gas flowing path controller 34b is formed in the ramping region 35a as illustrated in FIGS. 3A and 4A for the following reasons.

First, to maximize efficient preheating in the ramping region 35a, the source gas and the carrier gas flow through the main body 31 as closely as possible to the inner wall of the main body 31, which has a relatively high temperature due to the heating unit, thereby increasing the temperature of the supply gas to the temperature at which pyrolysis occurs faster.

Second, by reducing the area of the ramping region 35a to decrease the time that the supply gases such as the source gas and the carrier gas remains in the ramping region 35a, the size change of particularly a precursor, which is the source gas, is prevented, thereby preventing deterioration of dispersion characteristics of nanoparticles.

Therefore, by forming the gas flowing path controllers 34 in the ramping regions 35a as in FIGS. 3A and 4A, the source gas and the carrier gas flow into the ramping region 35a and mixes, and quickly pass through the ramping region 35a, and thus, most of the source gas is simultaneously pyrolyzed in the same region at the same temperature. The gas flowing path controller 34 has a cylindrical shape, symmetrical about the flow direction of the gases or has through-holes 38 formed inside the gas flowing path controller 34 as described above.

The present inventor manufactured nanoparticles through a pyrolysis method using a pyrolysis furnace including a gas flowing path controller. A conventional pyrolysis furnace in which a cylindrical-shaped gas flowing path controller was installed in a ramping region and a conventional reaction chamber were used.

To form Si nano particles on a substrate, $SiH_4$ was used as a source gas, and $N_2$ was used as a carrier gas. The cylindrical-shaped gas flowing path controller was installed in the ramping region of the pyrolysis furnace. Since $SiH_4$ starts to pyrolyze in the range of about 300-600° C., the temperature of the pyrolysis furnace was maintained greater than 300° C. using a heating unit. The pyrolyzed Si was deposited on the substrate, thereby forming nanoparticles. To compare to the prior art, other nanoparticles were formed under the same conditions except that the gas flowing path controller was not included in the pyrolysis furnace.

Figure 5:
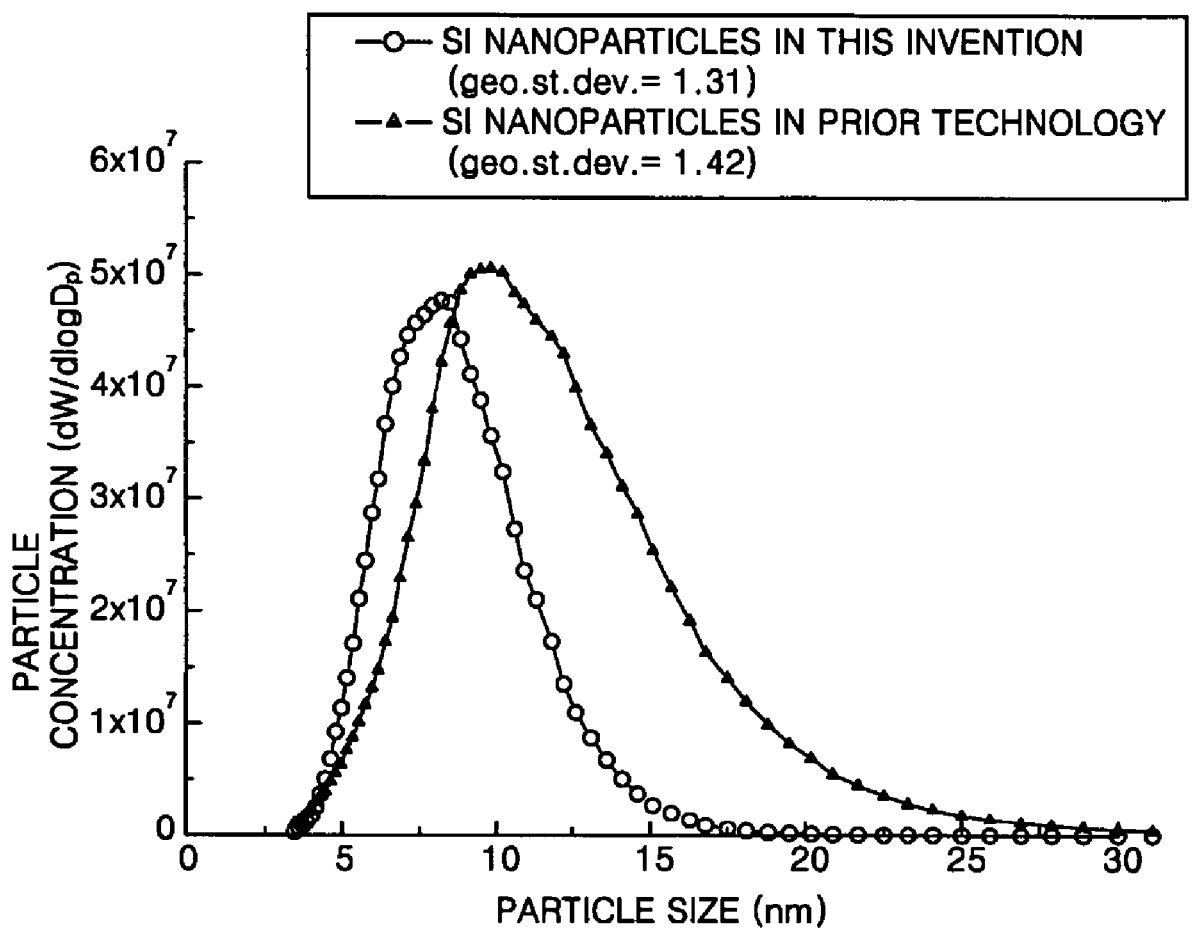
FIG. 5 is a graph comparing sizes and densities of nanoparticles formed using a pyrolysis furnace with a gas flowing path controller and nanoparticles formed using a pyrolysis furnace without a gas flowing path controller.

FIG. 5 is a graph comparing the sizes and densities of nanoparticles formed using the pyrolysis furnace with the gas flowing path controller and nanoparticles formed using the pyrolysis furnace without the gas flowing path controller as described above. The x-axis represents the size of the nanoparticles, and the y-axis represents the distribution of nanoparticles according to the sizes of the nanoparticles.

Referring to FIG. 5, Si nanoparticles with a diameter of about 8 nm were mostly formed while nanoparticles with a diameter greater than 15 nm were hardly formed when using the pyrolysis furnace according to an embodiment of the present invention. In other words, the nanoparticles were very uniform in size. However, Si nanoparticles with a diameter about 10 nm were mostly formed using the conventional technique and quite a few nanoparticles with a diameter greater than 15 nm were formed, and thus the distribution of the diameters of the nanoparticles were wide.

The standard deviations of the size of Si nanoparticles formed using the present invention and Si nanoparticles formed using the conventional technique were measured. It was determined that the standard deviation of the size of the Si nanoparticles formed using the present invention was 1.31, while the standard deviation of the size of the Si nanoparticles formed using the conventional technique was 1.42. Therefore, the statistical data indicates that nanoparticles with improved characteristics can be formed when the gas flowing path controller is formed in the pyrolysis furnace as in the present invention.

The present invention has the following advantages over the conventional method of manufacturing nanoparticles. Nanoparticles of uniform size can be manufactured by forming a gas flowing path controller in a ramping region to control pyrolysis characteristics and uniformly heat source gases. In particular, since deterioration of dispersion characteristics can be prevented when a source gas with a high concentration is used, it is possible to manufacture small-sized nanoparticles having excellent characteristics. Thus, the efficiency of the overall manufacturing process can be improved.

The present invention has been particularly shown and described with reference to exemplary embodiments thereof. However, the gas flowing path controller can be formed in various shapes besides the cylindrical shape and can be structured to have a plurality of holes therein, and may have, for example, a mesh structure, a lattice structure, or a beehive structure. Therefore, it will be understood by those of ordinary skill in the art that various changes in form and details may be made therein without departing from the spirit and scope of the present invention as defined by the following claims.

What is claimed is:

1. A pyrolysis furnace comprising:
    a main body of the pyrolysis furnace;
    a heating unit that is formed around the main body and controls the temperature of the main body;
    at least one gas supplying tube through which a gas flows into the main body;
and
    a gas flowing path controller that is installed inside the main body and controls the flow of the gas,
    wherein the main body comprises:
    a ramping region in which a supply gas is preheated; and
    a pyrolysis region in which the supply gas is pyrolyzed, and
    wherein the gas flowing path controller is installed in the ramping region;
    an outer wall of the gas flowing path controller contacts an inner wall of the main body, and at least one gas flowing path is formed inside the gas flowing path controller so that the gas can flow into the pyrolysis region, and
    the gas flowing path comprises through-holes passing through the gas flowing path controller.

2. The pyrolysis furnace of claim 1, wherein a gas flowing path is formed between an outer wall of the gas flowing path controller and an inner wall of the main body so that the gas can flow into the pyrolysis region between the outer wall of the gas flowing path controller and the inner wall of the main body.

3. The pyrolysis furnace of claim 2, wherein the gas flowing path controller is supported by a movable supporter connected to the gas flowing path controller and a side wall of the main body so that the location of the gas flowing path controller can be adjusted inside the main body.

4. The pyrolysis furnace of claim 1, wherein the diameters of the through-holes are greater near the inner wall of the main body.

5. The pyrolysis furnace of claim 1, wherein the gas flowing path controller is formed of the same material as the main body.

6. The pyrolysis furnace of claim 1, wherein the gas flowing path controller is formed of a material including quartz.

* * * * *